Dec. 4, 1956 A. M. OPSAHL 2,773,149
TEMPERATURE COMPENSATED RECLOSERS
Filed Sept. 30, 1952 2 Sheets-Sheet 1

WITNESSES:
E. A. McCloskey
F. V. Giolma

INVENTOR
Alert M. Opsahl.
BY
Ralph H. Swingle
ATTORNEY

Dec. 4, 1956 A. M. OPSAHL 2,773,149
TEMPERATURE COMPENSATED RECLOSERS
Filed Sept. 30, 1952 2 Sheets-Sheet 2

INVENTOR
Alert M. Opsahl.

United States Patent Office 2,773,149
Patented Dec. 4, 1956

2,773,149

TEMPERATURE COMPENSATED RECLOSERS

Alert M. Opsahl, Pittsburgh, Pa., assignor to Westinghouse Electric Corporation, East Pittsburgh, Pa., a corporation of Pennsylvania Application September 30, 1952, Serial No. 312,283

15 Claims. (Cl. 200—89)

My invention relates generally to circuit interrupters and it has reference in particular to (reclosers having) fluid operated integrators and dashpots with temperature compensating valves.

Generally stated it is an object of my invention to provide novel temperature compensated circuit interrupters.

More specifically it is an object of my invention to provide a simple and inexpensive temperature compensating check valve for circuit interrupters.

Another object of my invention is to provide in a circuit interrupter an improved temperature compensating fluid valve in which relatively high fluid pressures do not affect the adjustment of the valve.

Yet another object of my invention is to provide a simple and compact temperature compensating fluid check valve which is readily adapted to use in different locations in circuit interrupters.

It is also an object of my invention to provide in a temperature compensating fluid valve for using a cam operated by a bimetallic element for actuating a ball check valve to vary the effective opening of the valve.

It is an important object of my invention to provide in a temperature compensating valve for a circuit interrupter, for using a screw member operated by a bimetallic element for actuating a valve member to vary the effective valve opening.

In practicing my invention in accordance with one of its forms the dashpot of a reclosing circuit interrupter or recloser is provided with an opening into which a bushing is threaded having an orifice disposed to be blocked by a ball check valve. A plunger is disposed to unseat the ball and is actuated by a cam on a shaft rotatable transversely of the plunger. A bimetallic element rotates the cam to vary leakage from the dashpot through the valve so as to compensate for increased viscosity of the fluid in the dashpot at low temperatures.

For a more complete understanding of the nature and scope of my invention reference may be made to the following detailed description which may be read in connection with the accompanying drawings in which.

Figure 1:
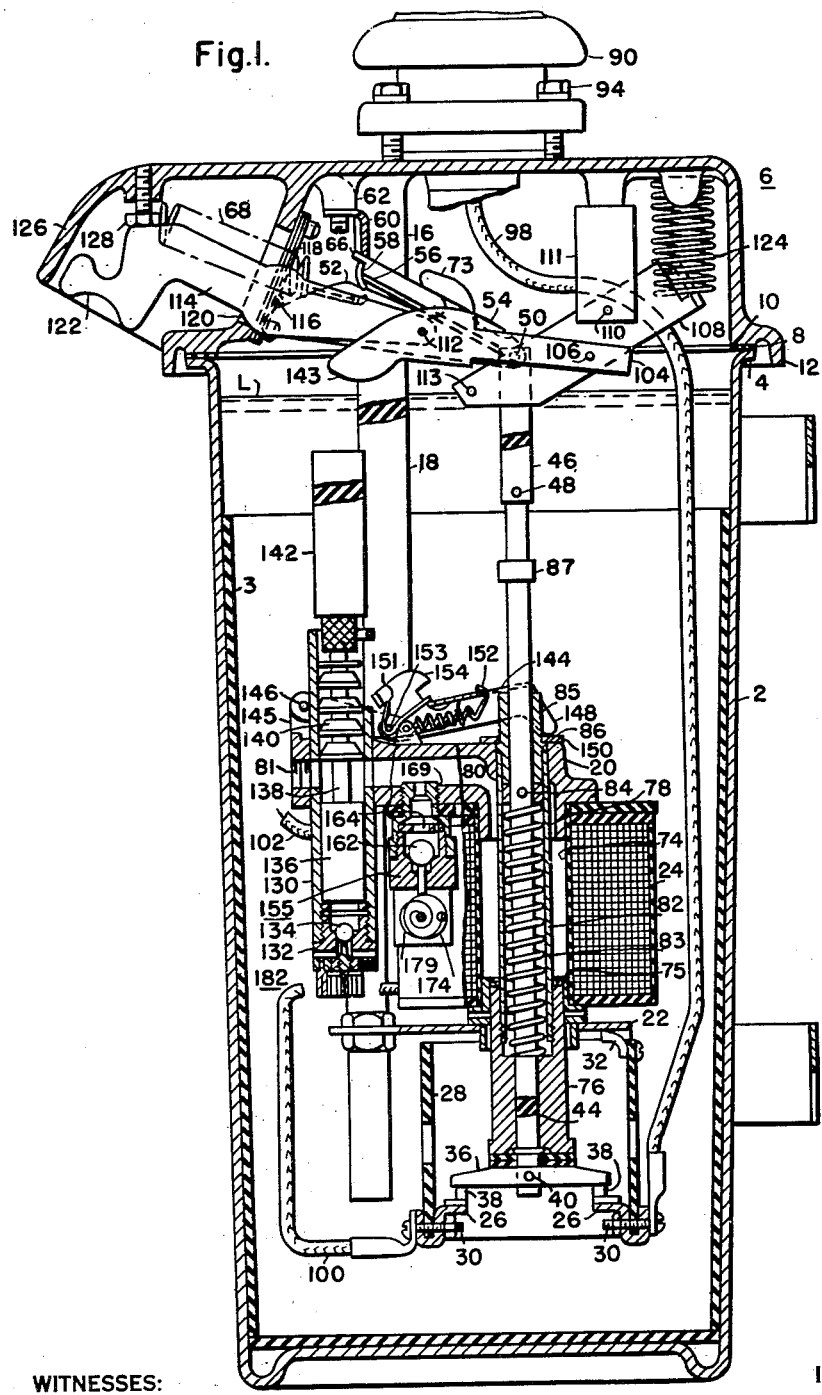
Figure 1 is a substantially central vertical section view, broken out in part, of a circuit breaker constructed in accordance with this invention.

The circuit interrupter or recloser shown in the drawings is an improvement on that disclosed and described in detail in copending application Serial No. 719,524 of James M. Wallace et al., filed on December 31, 1946 and entitled Circuit Interrupters, and is illustrated as being mounted in a metal tank 2 having a closed bottom wall and an open top. Preferably, the tank is adapted to be lined at least over the bottom wall and up to a point adjacent the open top of the container with a liner 3 of insulating material such as fiber, or the like, and is filled up to the level L with liquid, preferably a liquid having arc extinguishing ability such as oil. The upper end of tank 2 is provided with an outwardly extending flange 4 on which the flange 8 of a cover casting 6 is adapted to be seated, preferably, with a gasket 10 interposed therebetween. Flange 8 of cover casting 6 may be provided with an integral lip 12, and the cover may be secured to the tank in any desired manner, such for example, as by bolts (not shown) secured to suitably formed brackets on the tank.

The interrupter contacts and certain of the contact actuating mechanism are adapted to be supported in tank 2 from cover casting 6 by means of a pair of integral supporting lugs 16 (only one of which is shown) depending from the top wall of the cover casting and adapted to engage insulating spacer rods 18 having threaded studs (not shown) engaging threaded openings in rods 18 and lugs 16 on supporting casting 20. A supporting plate 22, may be supported in a similar manner from casting 20, so that a solenoid coil 24 may be mounted between casting 20 and supporting plate 22, with the central opening in the coil aligned with openings provided in casting 20 and plate 22.

Spaced stationary contacts 26 of the interrupter are each supported from plate 22 by a support tube 28 of insulating material, such as fiber, with the stationary contacts being mounted on support tube 28 by means of screws 30 and with the upper end of the support tube 28 having brackets 32 by means of which the support tube is secured to supporting plate 22.

Stationary contacts 26 are adapted to be closed by engagement therewith of a bridging contact 36 having contact tips 38 at opposite ends thereof for engagement with the stationary contacts, respectively. Bridging contact 36 is supported substantially centrally thereof on a slidable contact actuating rod 44 by pivot pin 40 for limited pivotal movement about a transverse axis on contact actuating rod 44. Contact rod 44 being mounted for longitudinal sliding movement through coil 24 and the aligned openings in plate 22 and casting 20, it will be observed that bridging contact 36 is free to adjust itself to the stationary contacts by restricted pivotal movement about its pivot mounting. 40. Contact rod 44 should be of an insulating material such as fiber or a molded insulating material.

The upper end of contact actuating rod 44 has a pair of connecting links 46 positioned at each side thereof and pivoted thereon as by a pivot pin 48, with the upper ends of these connecting links mounted on a common pivot pin 50 for a pair of toggle levers 52 and 54. Toggle levers 52 and 54 are both formed of sheet material, with lever 54 being bent to substantially channel form with outwardly extending flanges 56 adapted to be received at the free ends thereof in recesses 58 provided in the spaced downwardly depending fingers of an angled supporting bracket 60 which, in turn, is secured as by a screw 64 to a lug 62 integral with the cover casting. Preferably, the base of the channel part of toggle lever 54 is extended at 66 through the space between the supporting fingers of bracket 60, and at the other end of lever 54 the sides of the channel formation thereof are extended to be mounted on pivot pin 50. A coil tension spring 68 has one end hooked into an opening provided in toggle lever 52, and has the opposite end thereof hooked over an integral spring support on the cover casting.

It will be observed that in the closed circuit position of the breaker illustrated on the drawings, the line of action of toggle spring 68 is below the pivot supporting recesses 58 for toggle lever 54, and accordingly, the toggle spring acts to bias bridging contact 36 into engagement with stationary contacts 26 of the interrupter, under a predetermined pressure. However, as soon as contact operating rod 44 moves upwardly to separate the bridging contact from the fixed contacts of the interrupter, toggle lever 54 will pivot about recesses 58 and the line of action of toggle spring 68 will thus be caused to approach that pivot point so that in response to a very small contact separation the line of action of toggle spring 68 will pass through pivot recesses 58 which is the on-center position of the resilient toggle arrangement comprising toggle levers 52 and 54 and toggle spring 68. As a practical matter, the opening movement of the contacts necessary to move toggle levers 52 and 54 to the on-center position mentioned above may be made very small, in one operative device being on the order of one-quarter of an inch. When toggle levers 52 and 54 reach their on-center position referred to above, further relative movement of the two toggle levers in the same direction is prevented because the upper edge of toggle lever 52 engages the base of the central channel formation of toggle lever 54. Moreover, since the point at which toggle spring 68 is hooked into opening of lever 52 then substantially coincides with recesses 58 in which toggle lever 54 pivots during contact opening movement, it will be apparent that the remainder major part of contact opening movement will occur substantially uninfluenced by toggle spring 68.

Substantially the reverse of the above operation occurs when contact operating rod 44 moves downwardly to close the circuit from the full open contact position, because during the first and major part of contact closing movement, levers 52 and 54 will be in engagement so that such movement will be uninfluenced by toggle spring 68. However, as soon as pivot 50 passes below a line drawn from the remote end of toggle spring 68 through pivot recesses 58 for link 54, toggle spring 68 will then be effective to move the toggle levers toward the full line position shown in Fig. 1, and the force exerted by toggle spring 68 then tending to close the contacts will continue to increase as toggle levers 52 and 54 move further away from their on-center positions. While it is preferred when toggle levers 52 and 54 are in engagement that these levers be engaged as closely as possible to their on-center position, so that toggle spring 68 is ineffective to bias the contacts in either direction, rather than risking that the engagement occur at a position slightly overcenter, it may be desirable to make the engagement occur just prior to attainment by levers 52 and 54 of their on-center position. When this is done, toggle spring 68 will exert some slight bias tending to close the contacts, and this may be desirable in some cases. It will be noted that toggle lever 52 is provided with an integral hook 73 for limiting its separation from toggle lever 54.

Solenoid coil 24, previously mentioned, is adapted to be energized under certain conditions for automatically opening the circuit interrupter contacts. The central opening through coil 24 preferably is provided with a cylindrical sleeve 74 having a bushing 75 at the lower end in which a solenoid core 76 is adapted to be slidably mounted in a piston-like manner. The sleeve 74 communicates with an annular passage 78 in the casting 20, which connects with a passage 80 having a threaded end opening 81 for receiving a plug (not shown) if all time delay operation of the interrupter is desired.

A contact actuating sleeve 82 is telescoped over contact actuating rod 44 and its lower end is received in core 76 and preferably threadably mounted therein. A coil compression spring 83 is provided within actuating sleeve 82 on contact actuating rod 44 and is adapted to react between a shoulder in the core and a pin 84 extending transversely through actuating rod 44. A bushing 85 surmounts the sleeve 82 and is provided with a flange 86.

The circuit through the circuit interrupter thus far described may now be traced from the point where it enters tank 2 through one of a pair of terminal bushings 90 (only one being shown), with each bushing secured to cover castings 6 as by bolts 94, and each being provided with a conductor element which extends through the bushing and emerges from a reduced extension of the bushing seated in an opening provided in the top wall of cover casting 6, and proceeds by conductor 98 directly to one fixed contact 26 of the interrupter. When the contacts are in engagement, the circuit then proceeds through bridging contact 36 to the other fixed contact 26, and then by way of a conductor 100 to one terminal of solenoid coil 24. The other terminal of coil 24 is adapted to be connected by a conductor 102 to the conducting element in the other terminal bushing 90. It will be apparent that solenoid coil 24 in this embodiment of the invention is connected in series in the circuit through the circuit interrupter so as to be energized at all times when the circuit interrupter is closed, an amount dependent upon the value of current flowing in the circuit.

For any given rating of circuit interrupter, solenoid coil 24 is designed to become sufficiently energized when the load current in the circuit exceeds its rating as to attract core 76 and move it upwardly within sleeve 74. Core 76 will move upwardly relatively rapidly if the passage 80 is open, and slowly if it is closed, since it is necessary to displace the liquid in sleeve 74 above the core either through the opening 81 or through relatively small clearance between the core 76 and bushing 75 of support plate 22, and between sleeve 82 and casting 20. Accordingly, if the opening 81 is open, as shown, opening movement of the core will not be slowed up by the aforesaid dashpot action and opening movement thereof may be relatively rapid. When core 76 commences its upward travel, bridging contact 36 being held engaged by toggle spring 68 does not move so that spring 83 is compressed until it is substantially solid, at which point the upper end of bushing 85 strikes a collar 87 secured to rod 44. Thereupon actuating rod 44 moves upwardly, and the force exerted by toggle spring 68 begins to decrease and in a very short distance has substantially no value at all, so that the remaining major part of the circuit opening movement of bridging contact 36 occurs extremely rapidly due to expansion of spring 83.

When the interrupter or recloser contacts have attained their full open circuit position, the parts associated therewith are biased to return by gravity, and as previously pointed out, they may also be biased by toggle spring 68 if it is desired to stop relative movement of toggle levers 52 and 54 just short of attaining their on-center position during opening of the contacts. In either case, the closing bias is relatively light and will not be opposed by the dashpot action of core 76 if the passage 80 is open. Accordingly, the return movement will be relatively under the influence of gravity until pivot point 50 moves below a line extending through pivot recesses 58 and the fixed end of spring 68, whereupon bridging contact will be rapidly moved to effect a snap-action closing of the contacts by toggle spring 68.

In order to limit the number of operations of the circuit interrupter in close succession upon the occurrence of a continuing overload on the circuit and to provide for manual operation, means are provided for holding the contacts open in response to the occurrence of a predetermined number of closely succeeding circuit interrupting operations, which means can be manually actuated. This means comprises a toggle lever 104 pivoted at one end as at 106 on a U-shaped spring lever 108, which, in turn is pivotally supported as at 110 between the legs of a U-shaped supporting bracket 111 secured to cover casting 6. The other end of toggle lever 104 is pivoted, as by a pivot pin 112, to the adjacent end of a second toggle lever 114, and this, in turn, is mounted on a pivot pin 116 intermediate its ends, with the pin 116 being mounted in a bracket 118 secured to the adjacent wall of cover casting 6. A slot 120 is provided through the cover casting 6 for receiving the other end of toggle lever 114 which acts as a manual operating handle at the exterior of the circuit breaker casing, being provided with an angled hook end 122. A coil compression spring 124 is mounted to react between the bight of lever 108 and cover casting 6. Normally, toggle levers 104 and 114 are held by spring 124 with pivot 112 below the center line connecting pins 106 and 116, with the outer end of lever 114 positioned in and beneath an integral hood 126 on cover casting 6, in engagement with an adjustable stop screw 128 mounted in the hood.

In the position of toggle levers 104 and 114 illustrated, they have no effect on operation of the circuit interrupter as previously described, being normally inactive in this respect. However, lever 108 has a connecting pin 113 extending beneath toggle levers 52 and 54. Accordingly, if it is desired to manually open the circuit interrupter contacts, a hook stick or similar operating member may be engaged with the upper side of angle hook 122 of toggle lever 114 and pulled downwardly to rotate the toggle lever in a counterclockwise direction about its supporting pivot 116 to move toggle levers 104 and 114 overcenter in an upward direction, and in doing this, pin 113 engages toggle levers 52 and 54 and moves them upwardly in a counterclockwise direction, thus carrying contact actuating rod 44 upwardly to separate bridging contact 36 from stationary contacts 26. The contacts will be held open by spring 124 which maintains toggle levers 104 and 114 in their upper overcenter position. In thus manually opening the circuit after toggle spring 68 is moved to its on-center position, it will be observed that the spring 124 is only required to maintain the contacts of the interrupter open against the relatively light closing bias due to gravity, and such light bias as may be due to toggle spring 68 in the event that toggle levers 52 and 54 are stopped just prior to reaching their on-center position.

With the contacts maintained at their open circuit position following the manual circuit opening operation described above, it will be apparent that the outer end of toggle lever 114 projects below hood 126 of cover casting 6 so as to provide a readily visible indication that the contacts are maintained at open circuit position. It will further be apparent that the contacts may then be closed only by manual operation of toggle lever 114 in the opposite direction, that is, by exerting an upward force on the outer end of the toggle lever by engagement of a hook stick or the like with the underside of hook 122, to rotate lever 114 in a clockwise direction to move it and toggle lever 104 back overcenter to the full line position illustrated on the drawings. This manual operation of toggle lever 114 does not directly close the contacts but merely permits closure of the contacts in the manner previously described, that is, initial closing movement of the contacts being due to the bias of gravity and possibly some slight bias due to toggle spring 68, until bridging contact 36 is closely adjacent stationary contacts 26, when toggle spring 68 is moved below its on-center position and suddenly becomes effective to finally move the contacts into engagement rapidly. It will be observed that on manual opening of the circuit, the full force of spring 124 becomes effective to open the contacts as soon as levers 104 and 114 move overcenter, and actual opening of the contacts by spring 124 is independent of the operating hook stick. Similarly in manually resetting toggle levers 104 and 114 there is no possibility that withdrawal of the hook stick after resetting can disturb the position of the toggle levers because in resetting the hook stick engages only a lower edge surface of hook 122.

An integrating mechanism for automatically moving toggle levers 104 and 114 upwardly overcenter and thus preventing reclosure of the circuit interrupter in response to a predetermined number of closely successive circuit interrupting operations is provided, comprising a cylindrical tube 130 clamped or otherwise secured in a lateral extension of casting 20 at the top of solenoid coil 24, and this tube has a plug 132 threaded into the lower end thereof with the plug having a small central opening controlled by a ball-check valve 134, which permits flow of fluid into the lower end of tube 130 but prevents outflow. An integrating piston 136 is mounted in tube 130 and normally rests on the upper end of plug 132, being provided with a reduced extension 138 at the upper end thereof having a plurality of spaced circular flanges 140 forming rack teeth thereon, and having an elongated extension 142 of insulating material on the extreme outer end thereof which is positioned below an extension 143 on toggle lever 104. A pawl lever 144 is pivotally mounted at one end as at 146, this end of pawl lever 144 being split with legs located at each side of tube 130 and with pivot 146 supported on spaced supporting flanges 145 integral with casting 20. Pawl lever 144 has a connecting web intermediate its ends, and at the other end thereof the sides of the lever are extended outwardly and laterally as at 148, to normally be in engagement with a washer 150 mounted on actuating tube 82 in engagement with flange 86 adjacent the outer end of this tube. Pawl lever 144 is normally biased into engagement with washer 150 by a coil tension spring 152 hooked over the remote edge of the web of the pawl lever at one end, and anchored to an ear integral with casting 20 at its other end. Pawl lever 144 is provided with a pawl member 154 pivoted thereon as at 153, and biased by a spring 151 in a counterclockwise direction to a position wherein a portion of pawl member 154 engages the connecting web of pawl lever 144.

The tube 130 intersects the passage 80 of the dashpot, and the piston 136 acts as a valve to control venting thereof. With the piston as shown the dashpot vents freely and operation of the breaker is rapid. When the piston 136 is moved upwardly by the pawl 154 it first partially and then completely blocks the passage 80 so as to delay operation of the armature 76 slightly, and then with an inverse time current characteristic.

Figure 2:
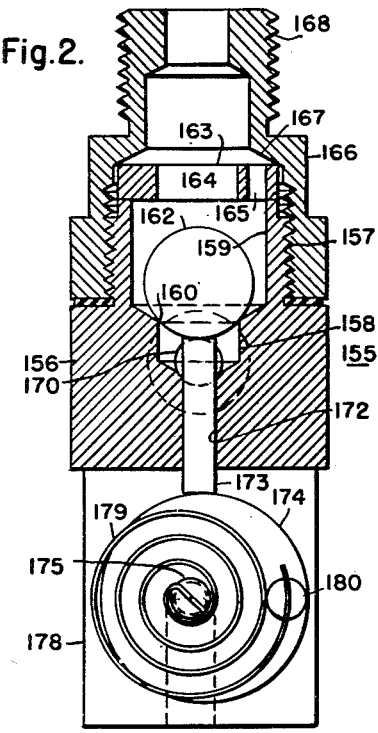
Fig. 2 is an enlarged vertical sectional view of one of the thermoresponsive valves shown in Fig. 1.
Figure 3:
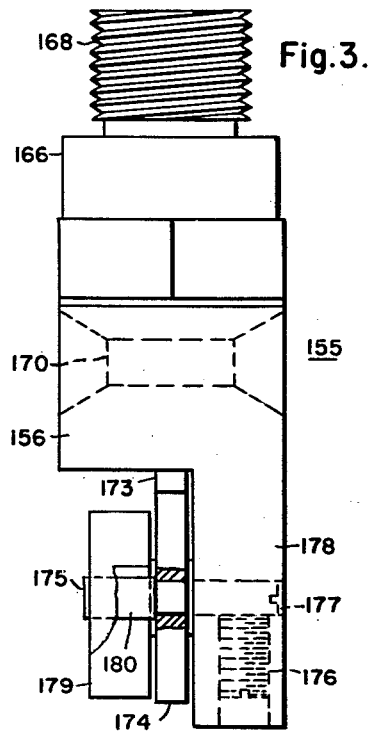
Fig. 3 is an enlarged side elevational view of the same valve as shown in Fig. 2, taken at substantially right angles to the section of Fig. 2.

In order to obtain more uniform time delay characteristics in operation of the circuit breaker, a thermoresponsive valve 155 may be provided for effecting controlled venting of the dashpot passage 80 in accordance with changes in temperature. The valve may, as shown in Figs. 2 and 3, comprise a bushing 156 having a threaded extension 157 at one end and an axial bore 158 connecting with an enlarged chamber or bore 159 to define a valve seat 160. A ball valve 162 is disposed in this enlarged bore to block bore 158. It is retained by a washer 163 having an axial opening 164 and a bypass orifice 165 to control the rate of flow into the dashpot. A bushing 166 is threaded on the extension 157 having means such as the peripheral shoulder 167 to secure the washer 163 in place, and a threaded extension 168 disposed to be threaded into an opening 169 in casting 20, connecting with the passage 80.

Transverse openings 170 are provided in the bushing 156 connecting with the bore 158. A reduced axial bore 172 accommodates a valve lifter rod 173. Operation of the rod 173 is effected by an eccentric cam 174 rotatably mounted on a stub shaft 175 adjustably secured by a set screw 176 in a transverse opening 177 in an axial extension 178 of the bushing 156 on one side of the axial bore.

Actuation of the cam 174 is effected by a spiral bimetallic spring 179 comprising laminations of brass and steel, for example, secured at one end to a pin 180 projecting from the cam 174, and at the other end secured in a slot in the end of shaft 175. The cam is arranged to actuate the lifter rod in response to temperature changes, so as to open the valve and permit increased leakage of oil as the temperature drops and the oil viscosity increases. Adjustments may be made by loosening set screw 176 and rotating shaft 175 to change the initial adjustment of cam 174.

Figure 4:
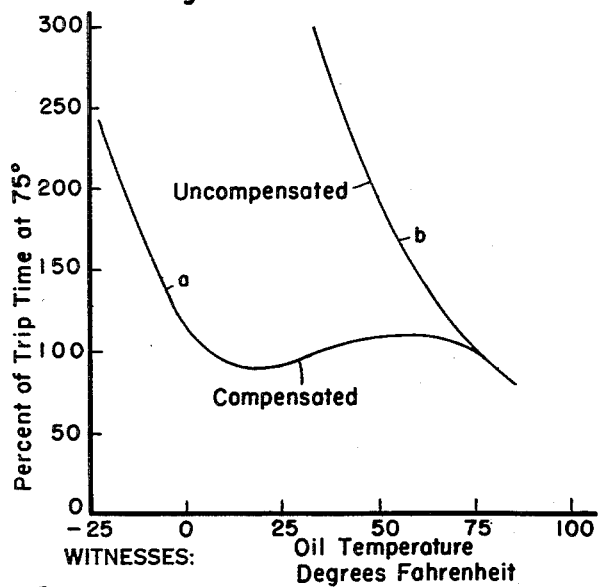
Fig. 4 shows curves illustrating the operating characteristics of a circuit breaker such as shown in Fig. 1, when equipped with the valves shown in Fig. 2.

By using such a temperature compensating valve, the time delay characteristics of the dashpot may be made much more uniform, particularly over the range of zero degrees to seventy-five degrees Fahrenheit, as shown by the compensated curve *a* of Fig. 4, as contrasted with the uncompensated curve *b*.

Figure 5:
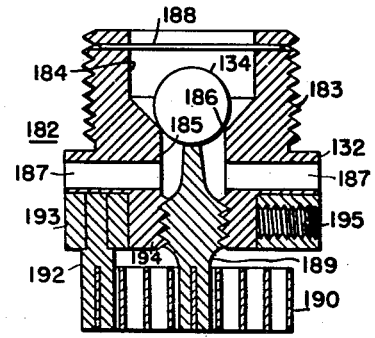
Fig. 5 is an enlarged vertical sectional view of the other valve shown in Fig. 1.

With a view to effecting more uniform delay in the reset time of the counter piston 136, which also controls the dashpot action of the circuit breaker, a thermoresponsive valve 182 may be incorporated into the plug 132. As shown in Fig. 5, the plug 132 may have a threaded extension 183 by which it is screwed into the lower end of tube 130. Ball valve 134 may be disposed in an enlarged recess or bore 184 which connects with an axial bore 185 to define a valve seat 186. Transverse bores 187 connect with bore 185 and a pin 188 secures ball valve 134 in recess 184.

A valve lifter 189 is threadably disposed in the lower end of bore 185 for lifting the valve 134 from seat 186. It is actuated by a spiral bimetallic element 190 having one end secured in a slot in the lower end of lifter 189, and the other end secured to a pin 192 mounted in a ring 193 adjustably disposed on a reduced extension 194 of bushing 132 by means of a set screw 195 which may be loosened to permit rotation of ring to adjust the initial position of lifter 189.

When the circuit interrupter operates to open the circuit, core 76 moves up with sleeve 82 and bushing 85. Washer 150 will be carried upwardly with actuating sleeve 82 and thus carry the free end of pawl lever 144 upwardly with it to move pawl member 154 into engagement with the upper one of flanges 140 on integrating piston 136 to thus carry the piston upwardly a predetermined distance. The upward movement of core 76 will be rapid, since passage 80 is freely vented at opening 81. When the interrupter recloses following such a first circuit interrupting operation, integrating piston 136 is left at the position to which it was advanced, since pawl member 154 is free to disengage circular flanges 140, and if the interrupter remains closed, integrator piston 136 will slowly reset to the position shown in Fig. 1 due to leakage of liquid in cylinder 130 below piston 136 through the relatively small clearance between the cylinder and piston. However, if the interrupter immediately reopens after a first opening and reclosing operating, pawl member 154 this time will engage the next lower circular flange 140 on the integrator piston and raise the piston a further amount so that it blocks the opening 81. Subsequent reclosing will result then in leaving piston 136 at this further advanced position from which it eventually will reset slowly as ball 162 is drawn upwardly to block opening 164, permitting oil to be drawn into the dashpot through orifice 165 if the interrupter remains closed. However, in the event of a continuing overload, the breaker will again open, this time with an inverse time delay as opening 81 is blocked by piston 136 and oil must escape between core 76 and sleeve 74. The ball 162 will thereupon control the delay by reason of the lifter rod lifting the ball 162 from its seat in the event the oil is cool, to compensate for the decreased flow rate. The pawl member 154 again advances integrator piston 136 this third time and reclosing takes place with controlled delay, since the flow of oil into the dashpot causes valve 162 to rise and block bore 164, leaving only orifice 165 open to admit oil to passage 80 of the dashpot.

If the fault continues, the breaker opens with controlled inverse time delay and the piston 136 advances again, the extension 142 thereof engaging the extension 143 of toggle lever 104. This moves this lever upwardly overcenter, so that toggle spring 124 will maintain the contacts separated in the manner previously described. It is thus apparent that toggle levers 104 and 114 will be automatically moved upwardly overcenter to maintain the breaker contacts separated only in response to a predetermined number of closely successive circuit opening and closing operations, usually four such operations, however, in the event a lesser number of closely successive opening and closing operations occurs, the integrating mechanism will reset and the breaker contacts will be automatically held open only when the aforesaid predetermined number of opening and closing operations occurs in close succession. Obviously, after the breaker contacts have been automatically actuated to a position where they are held open by toggle spring 124, they can be reclosed only by manual operation of toggle lever 114 in the manner previously described.

From the foregoing it will be apparent that I have provided in a new and novel manner for obtaining improved performance of circuit interrupters under widely varying temperature conditions. While I have illustrated different types of temperature compensating valves applied to the dashpot and integrator of a circuit interrupter, it will be understood that either types may be used equally well in either application. A high degree of temperature compensation is attained by reason of the friction load on the actuating bimetal being maintained at a minimum. A valve embodying the principles of my invention is self-contained and may be easily manufactured and easily applied.

Having described a preferred embodiment of the invention in accordance with the patent statutes, it is desired that this invention be not limited to this particular construction inasmuch as it will be apparent, particularly to persons skilled in this art, that many modifications and changes may be made in this particular structure without departing from the broad spirit and scope of this invention. Accordingly, it is desired that the invention be interpreted as broadly as possible and that it be limited only as required by the prior art.

I claim as my invention:

1. A circuit interrupter comprising, separable contacts biased to close, electroresponsive means having a part movable to effect separation of the contacts, dashpot means delaying movement of said part, said dashpot means having an opening for venting the dashpot means, a bushing disposed in said opening, a valve member disposed in said bushing to control said opening, a bimetallic member, and means including a rotatable member having an inclined plane surface and rotated by the bimetallic member to effect movement of the valve member by inclined plane action.

2. In a circuit interrupter, separable contacts, electroresponsive means having a part movable to effect separation of said contacts, means biasing said contact to reclose, dashpot means controlling movement of said movable part, said dashpot means having an opening, a bushing disposed in said opening having an orifice for venting said dashpot, a valve member disposed to block said orifice, a valve operating means having a part advanceable to actuate the valve member to prevent it from blocking the orifice and an inclined plane part rotatable to effect such advancement, and means including bimetallic operating means for rotating the inclined plane part in accordance with predetermined temperature conditions.

3. A circuit breaker comprising separable contacts, electroresponsive means having a movable part for separating said contacts, said contacts being biased to reclose, dashpot means controlling movement of said movable part, said dashpot means having a vent opening, a bushing threaded into said opening and having an orifice with a valve seat, a valve member disposed to engage said seat, operating means engaging said valve member including a part having an inclined plane surface for effecting movement thereof to lift it off said seat, and a thermally responsive actuating member operable in response to changes in temperature to actuate the part having the inclined plane surface.

4. In a circuit interrupter having separable contacts, electroresponsive means including a part movable to effect separation of said contacts, dashpot means including a tubular casing disposed to receive at least a part of the movable part and a member having an internal chamber connected with the tubular casing and provided with a vent opening, a bushing threadably disposed in said opening having an opening therethrough with an enlarged recess at one end providing a valve seat, a valve member disposed in said recess to block the opening, a cam member actuable to lift the valve member from the seat, and a helical bimetallic member mounted on the bushing to rotate the cam member.

5. In a circuit interrupter having separable contacts, electroresponsive means including an armature movable to effect separation of the contacts, dashpot means for delaying movement of said armature including a casing which receives a part of the armature and a casting having a chamber connecting with the casing and provided with a vent, counting means having a part actuated in response to movement of the armature to lock the contacts open after a predetermined number of closely successive operations of the electroresponsive means, valve means actuated by the counting means to close the vent of said dashpot means, additional dashpot means including a cylinder for receiving the valve means, a bushing substantially closing one end of said cylinder and having an orifice therethrough with a seat at one end, a valve member disposed on said seat, a screw member rotatably disposed in the bushing to lift the valve member from said seat, and a bimetallic member connected to said screw member for rotating it in response to changes in temperature.

6. In a circuit interrupter, separable contacts, electroresponsive means including an armature movable to effect separation of said contacts, dashpot means for delaying movement of said armature, valve means disposed to vent said dashpot, said valve means including a valve member movable to different positions in accordance with the direction of movement of the armature, and an actuating member having an inclined plane surface for actuating the valve member, thermoresponsive means operable to advance the actuating member by inclined plane action to actuate the valve member in one position to control venting of the dashpot, and means providing a fixed vent in the other position of the valve member.

7. A circuit interrupter comprising, separable contacts, electroresponsive means having an armature movable to effect separation of said contacts, fluid dashpot means operable to delay movement of said armature in opposite directions, means biasing said contacts to reclose following separation, a valve member movable with the flow of fluid to and from the dashpot in opposite directions to control venting of the dashpot means in both directions, a bimetallic member disposed to actuate the valve member in one of said directions to determine venting of the dashpot means with the valve member moved in said one direction, and means providing a seat for the valve member to operate as a check valve and having a bypass orifice to determine venting of the dashpot means with the valve member moved in the other direction.

8. In a circuit interrupter, separable contacts, dashpot means delaying movement of said contacts, and means venting said dashpot means including a thermostatic valve having a bushing with an axial bore and a threaded extension at one end, said bushing having an axial extension at the other end on one side of the bore and said bore having an enlarged portion defining a valve seat, a valve member disposed in said enlarged portion, a valve lifter slidably disposed in said bore, a shaft rotatably supported by the axial extension and projecting transversely of the bore, means operable to lock the shaft in different rotational positions, a cam rotatably mounted on said shaft to engage the lifter, and a spiral bimetallic operating member connecting the shaft and cam to effect rotation of the cam with changes in temperature.

9. In a circuit interrupter having a dashpot for delaying separation of its contacts, a thermostatic valve, a bushing having an orifice connecting with said dashpot, a valve member for blocking said orifice, means engaging the valve member including rotatable actuating means having an inclined plane surface operable to actuate the valve member, and a bimetallic element mounted on the bushing for effecting rotational movement of the actuating means.

10. In a circuit interrupter, separable contacts, dashpot means delaying movement of said contacts, and a valve means having a bushing with a threaded extension adjacent one end and an axial bore therethrough for venting the dashpot, a valve member disposed to block said bore, actuating means having a part axially movable in said bore to move the valve member to prevent it blocking said bore and an inclined plane part having an inclined plane surface for advancing said axially movable part, and thermo-responsive means mounted on the bushing operable to actuate the inclined plane part.

11. The combination in a circuit interrupter, of seperable contacts, electroresponsive means operable in response to an overcurrent to effect separation of said contacts, dashpot means delaying operation of said electroresponsive means, and a valve operable to vent said dashpot means comprising a bushing having a threaded extension for mounting in a vent and having an axial bore with an enlarged valve recess connected therewith, a movable valve member in said recess, retaining means for retaining the valve member in said recess, a transverse shaft mounted on the bushing, a cam rotatably disposed on the shaft to effect movement of the valve member, and a bimetallic member connecting the cam and shaft to effect rotational movement of said cam.

12. In a circuit interrupter; a dashpot to delay contact separation; and means venting the dashpot including a thermoresponsive valve comprising, a bushing having a threaded extension at one end and an axial bore with an enlarged recess defining a valve seat, said bushing having an axial extension at the other end on one side of the bore, a ball valve disposed in the recess, a shaft projecting from the axial extension transversely of the bore, an actuating member slidably disposed in the bore to engage the ball valve, a cam rotatably mounted on the shaft to engage the actuating member, and a spiral bimetallic member connecting the cam and shaft.

13. A circuit interrupter comprising, separable contacts, dashpot means delaying movement of said contacts, and means controlling venting of said dashpot means including a valve comprising, a bushing having a threaded extension at one end and an axial bore with an enlarged recess defining a valve seat adjacent the threaded end, a ball valve disposed in said recess, a lifter threadably mounted in said axial bore to engage the ball valve, and a bimetallic member mounted on the bushing to effect rotation of the lifter to engage and disengage the valve.

14. In a circuit interrupter, separable contacts, dashpot means delaying movement of said contacts, vent means for said dashpot means including a valve member having an additional dashpot means for delaying movement thereof and vent means for said additional dashpot means including a valve having a part with an axial bore with an enlarged recess defining a valve seat, said member having a threaded extension at one end for securing the valve in an opening, a ball valve disposed in said recess, a valve lifter threadably disposed in a portion of said bore to engage the valve, a ring adjustably secured to the member adjacent the end remote from the threaded extension, and a spiral bimetallic member connecting said ring and lifter to effect rotation of the latter.

15. In a circuit interrupter, separable contacts, fluid dashpot means delaying separation of said contacts including a valve chamber venting said dashpot means and having a valve member movable in opposite directions in said chamber with the direction of fluid flow, means engaged by the member when moved in one of said directions to one position, said means having a bypass orifice, and means including a bimetallic member engaged by the valve member when moved in the opposite direction to another position to determine the position of the member.

References Cited in the file of this patent

UNITED STATES PATENTS

| | | |
|---|---|---|
| 2,021,428 | Peo | Nov. 19, 1935 |
| 2,101,338 | Lovekin | Dec. 7, 1937 |
| 2,136,460 | Peteler | Nov. 15, 1938 |
| 2,308,660 | Kouyoumjian | Jan. 19, 1943 |
| 2,528,197 | Wallace | Oct. 31, 1950 |
| 2,626,329 | Wallace et al. | Jan. 20, 1953 |
| 2,680,170 | Wallace | June 1, 1954 |

OTHER REFERENCES

Publication titled, "An Improved Automatic Circuit Recloser," by J. M. Wallace, AIEE Technical Paper, 47–50 (November 1946).